(12) United States Patent
Guesdon et al.

(10) Patent No.: US 10,865,531 B2
(45) Date of Patent: Dec. 15, 2020

(54) DEVICE FOR DAMPING VIBRATIONS IN A CABLE, NOTABLY A CABLE STAY

(71) Applicant: SOLETANCHE FREYSSINET, Rueil Malmaison (FR)

(72) Inventors: Matthieu Guesdon, Boulogne-Billancourt (FR); Antoine Dugain, Bois-le-Roi (FR); Kevin Milandou, Franconville (FR); Maxime Teste, Saint-Didier-en-Velay (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 0 days.

(21) Appl. No.: 16/085,377

(22) PCT Filed: Mar. 17, 2017

(86) PCT No.: PCT/FR2017/050623
§ 371 (c)(1),
(2) Date: Sep. 14, 2018

(87) PCT Pub. No.: WO2017/158307
PCT Pub. Date: Sep. 21, 2017

(65) Prior Publication Data
US 2019/0078278 A1    Mar. 14, 2019

(30) Foreign Application Priority Data

Mar. 18, 2016 (FR) ...................................... 16 52344

(51) Int. Cl.
*B65D 63/00* (2006.01)
*E01D 19/14* (2006.01)
(Continued)

(52) U.S. Cl.
CPC ............. *E01D 19/14* (2013.01); *E01D 19/16* (2013.01); *F16F 15/023* (2013.01)

(58) Field of Classification Search
CPC ......... E01D 15/00; E01D 11/04; E01D 19/16; H02G 7/14
See application file for complete search history.

(56) References Cited

U.S. PATENT DOCUMENTS 3,421,167 A    1/1969  Kawada
9,617,697 B2 *  4/2017  Stubler .................. E01D 11/04
(Continued)

FOREIGN PATENT DOCUMENTS

FR    2 859 260 A1    3/2005
JP    H06 58370 A     3/1994
(Continued)

*Primary Examiner* — Amy J. Sterling
(74) *Attorney, Agent, or Firm* — Dentons US LLP

(57) ABSTRACT

The damping device comprises: a base comprising a through-orifice for receiving said cable, said through-orifice extending along at least a longitudinal axis, and at least one cylinder connected to said base and inclined with respect to said longitudinal axis at an angle other than 90°, and, for said cylinder, a complementary cylinder connected to said base and inclined with respect to said longitudinal axis at an angle other than 90°, the cylinder and the complementary cylinder being arranged on either side of a plane orthogonal to the longitudinal axis, the orthogonal plane containing a centre of the base, said centre being situated along the longitudinal axis.

21 Claims, 4 Drawing Sheets

(51) Int. Cl.
 *F16F 15/023* (2006.01)
 *E01D 19/16* (2006.01)

(56) References Cited

U.S. PATENT DOCUMENTS

2003/0093869 A1    5/2003  Petersen
2007/0061982 A1*   3/2007  Lecinq ................... E01D 19/16
                                                  14/22
2016/0273174 A1*   9/2016  Stubler .................. E01D 11/04

FOREIGN PATENT DOCUMENTS

JP       H09 59921 A      3/1997
KR    10-2004-0015461 A   2/2004

* cited by examiner

DEVICE FOR DAMPING VIBRATIONS IN A CABLE, NOTABLY A CABLE STAY

This application is the National Stage Entry of International Application No. PCT/FR2017/050623, filed Mar. 17, 2017, which claims the benefit of French Application No. 16 52344, filed Mar. 18, 2016, all of which are hereby incorporated by reference in their entirety for all purposes as if fully set forth herein.

BACKGROUND

The invention relates to the technical domain of devices for damping of vibrations that occur on cables, particularly stay cables.

In a known manner, stay cables such as those used for the suspension of bridge decks, are affected by vibrations that may for example be due to the passage of a vehicle on the bridge, or wind applied to the cables, etc.

To damp these vibrations, damping devices coupled to these cables are frequently used to at least partly dissipate energy due to these vibrations.

The range of damping devices includes several categories, including a category of so-called external devices that for example extend between the cable and a fixed structure located at a distance from the cable anchor and are fixed directly to the anchor, and so-called internal devices configured to damp vibrations by joint cooperation between the cable and a cable case, for example located close to the cable anchor.

Internal damping devices often include a plurality of piston dampers interposed between the cable and a portion of the case. These piston dampers then extend radially from the cable. They are then connected firstly to a reception part that grips the cable, and secondly at an end opposite the cable, close to or at the end of a radial tube formed in the case.

This configuration has disadvantages. The tubes thus formed in the case make the shape of the case complex and disgracious, and/or impose a very large diameter case. This increases the complexity of placement and the configuration of additional protection devices that may be imposed around cable anchors, such as fire retardant or anti-explosion devices, by the regulations, design constraints or the specification.

The invention aims at improving the situation.

SUMMARY

To achieve this, the invention relates to a damping device designed to damp vibrations of a cable, particularly a stay cable, the damping device comprising:

a base comprising a passage orifice for reception of said cable, said orifice extending at least along a longitudinal axis, and at least one piston damper connected to said base and inclined relative to said longitudinal axis by an angle not equal to 90°, and for said piston damper, an complementary piston damper connected to said base and inclined relative to said longitudinal axis by an angle not equal to 90°, the piston damper and the complementary piston damper being located on opposite sides of a plane orthogonal to the longitudinal axis, the orthogonal plane containing a centre of the base located along the longitudinal axis.

According to one aspect of the invention, the device comprises a plurality of piston dampers connected to said base and inclined from said longitudinal axis by an angle different from 90°, the damping device comprising, for each piston damper, a complementary piston damper connected to said base and inclined from said longitudinal axis by an angle different from 90°, the piston damper and the complementary piston damper being arranged on opposite sides of said plane orthogonal to the longitudinal axis and containing said centre.

According to one aspect of the invention, for at least one piston damper, said piston damper and the complementary piston damper are not arranged symmetrically relative to each other about said plane.

According to one aspect of the invention, said piston damper and said complementary piston damper are configured to develop forces along the X axis that approximately balance each other.

According to one aspect of the invention, for at least one piston damper, said piston damper and the complementary piston damper are arranged approximately symmetrically relative to each other about said plane.

According to one aspect of the invention, the angle between each piston damper and the longitudinal axis is an acute angle defined jointly by the corresponding piston damper and the longitudinal axis, said angle being less than 80°.

According to one aspect of the invention, said angle is less than 45°, and preferably less than 30°.

According to one aspect of the invention, the damping device further comprises a tube case defining a central passage inside which the base and the at least one piston damper are arranged.

According to one aspect of the invention, the tube case is rigid.

According to one aspect of the invention, the tube case is generally cylindrical in shape.

According to one aspect of the invention, the or each piston damper is connected to the tube case through one end of said piston damper opposite the base.

According to one aspect of the invention, at least one piston damper is connected to the tube case through a swivel connection.

According to one aspect of the invention, at least one piston damper is connected to the base through a swivel connection.

According to one aspect of the invention, the at least one piston damper comprises a plurality of piston dampers uniformly spaced around the longitudinal axis.

According to one aspect of the invention, for at least one piston damper, said piston damper and the complementary piston damper are located approximately in a plane orthogonal to the longitudinal axis.

According to one aspect of the invention, the damping device comprises a plurality of pairs of piston dampers each comprising a piston damper and the associated complementary piston damper, the pairs of piston dampers being connected at the base at uniformly spaced locations around the longitudinal axis.

According to one aspect of the invention, the base comprises a collar designed to compact said cable, the collar delimiting the inside of said passage orifice.

The invention also relates to a construction work, particularly such as a bridge, comprising a cable and a damping device as defined above, said cable fitting into the passage orifice of the base of the damping device.

According to one aspect of the invention, the construction work comprises an anchor block inside which one end of the cable fits to anchor the cable, the damping device comprising a tube case defining a central passage inside which the base and the at least one piston damper are located, the or each piston damper being connected to the tube case by one end of said piston damper opposite the base, the tube case being fixed relative to said anchor block.

According to one aspect of the invention, the construction work is a bridge.

BRIEF DESCRIPTION OF THE DRAWINGS

The invention will be better understood after reading the following detailed description, given purely as an example, with reference to the appended Figures on which.

DESCRIPTION OF EMBODIMENTS

Figure 1:
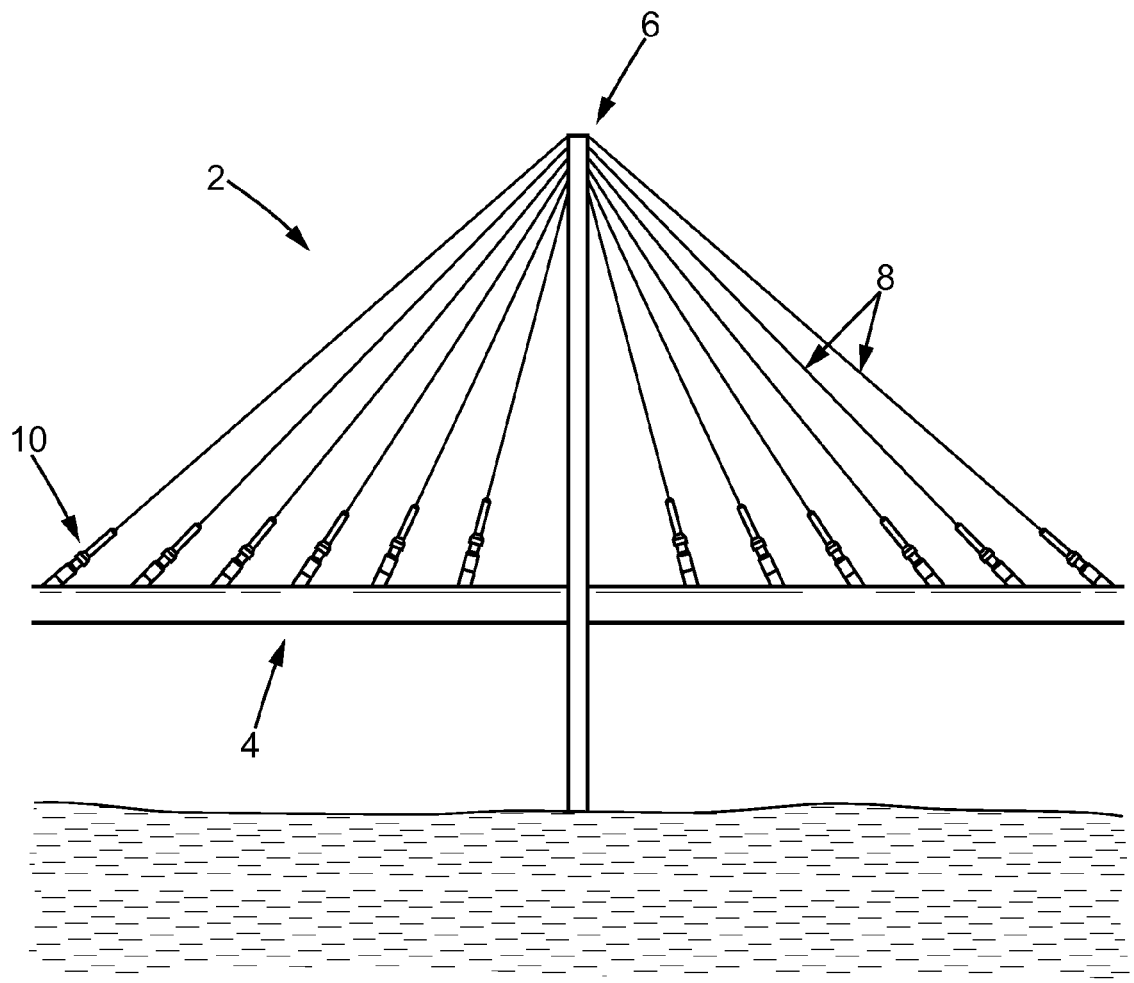
FIG. 1 is an illustration of an illustration of a construction work according to the invention.

FIG. 1 illustrates a construction work 2 according to the invention. In the non-limitative example in FIG. 1, the construction work is a stay cable bridge.

Alternatively, the construction work can be a guyed tower or a suspension bridge.

The bridge comprises a deck 4, pylons 6 and a plurality of cables 8. The cables 8 extend between one of the pylons 6 and the deck 4 and form stay cables from which the deck 4 is suspended.

For example, each cable 8 comprises a plurality of strands in contact with each other. The configuration of strands may for example be a known configuration in which strands extend inside a bundle in which the strands extend parallel to each other and in contact with each other.

The cable 8 is shown stripped in the example in the figures. As a variant, it is provided with at least one protective sheath over all or some of its length. For example, it may include an individual sheath for each strand and/or a collective sheath containing a plurality of strands.

As described in more detail below, the bridge 2 comprises a damping device according to the invention coupled to one of the cables 8. Advantageously, each cable is associated with a damping device according to the invention.

Figure 2:
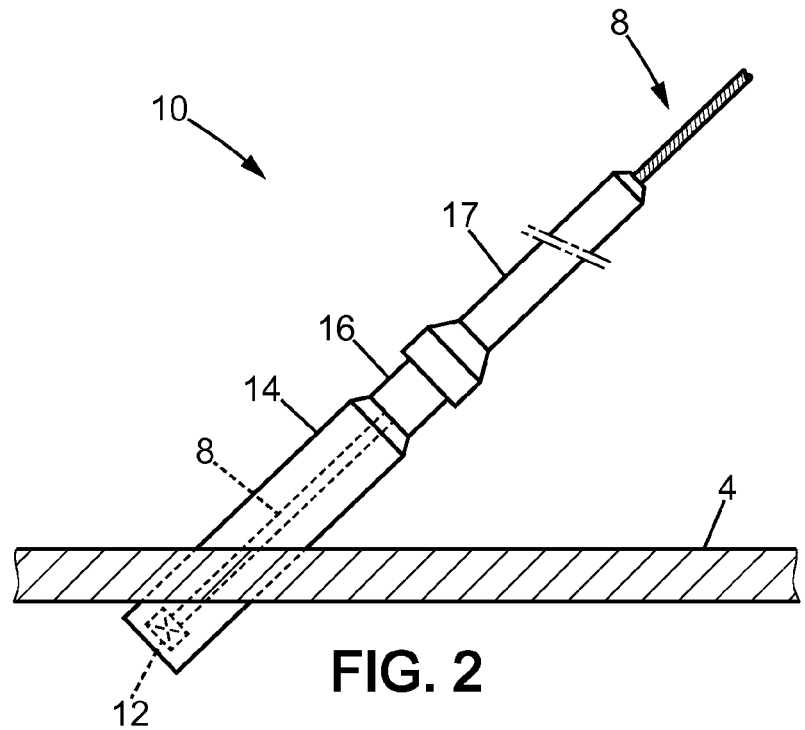
FIG. 2 is an illustration of an anchor zone of a cable of the construction work in FIG. 1 at the deck of the bridge.

FIG. 2 illustrates details of the anchor zone 10 for a cable 8 at the deck 4.

This anchor zone 10 comprises an anchor block 12 fixed relative to the deck 4 and receiving one end of the cable 8. The anchor block 12 may for example be of a known design.

The anchor zone 10 also comprises a first tube 14, a damping device 16 according to the invention and a second tube 17. Optionally, the anchor zone 10 also comprises a fire protection device and/or an explosion protection device (not shown).

The first tube 14, the damping device 16 and the second tube 17 are laid out adjacent to each other one after the other. For example, at least some of them are fixed to each other.

The first tube 14 is configured to protect the cable 8, the anchor block 12 and essential elements used to anchor the cable 8 in the anchor block 12. Furthermore, the first tube 14 is configured to guide the cable 8 in the vicinity of the anchor block. In some embodiments in which the anchor block 12 is not fixed to the deck 4 directly, the first tube is also fixed to the anchor block and is configured to transfer forces applied to the anchor block, to the deck. Advantageously, it is also configured to prevent third parties from accessing elements anchoring the cable 8 in the anchor block 12.

The first tube 14 is fixed to the deck 4 and contains the cable 8 inside it. Advantageously, it comprises a passage inside which the cable is arranged and the walls of which cooperate with the cable to guide the cable.

For example, the first tube 14 is known as the forming tube, or the encasing tube.

The second tube 17 is a case configured to prevent access to the cable 8. For example, the tube 17 is known as an anti-vandalism tube.

For example, the tube 17 slides onto the cable 8 and bears on the cable. For example, it may be connected to the device 16 through a swivel connection type connection. For example, this connection may be implemented through a collar interposed between the tube 17 and the device 16.

The damping device 16 is coupled to the cable 8. It is configured to damp vibrations applied to the cable 8. These vibrations may for example be due to vehicles passing on the deck, wind, etc.

The damping device 16 is an internal type of damping device as described above. In other words, it is configured to damp cable vibrations by cooperation between dampers fitted on the device 16 and the cable and a cable case. It is also indirectly fixed to the deck 4 as described below.

Figure 3:
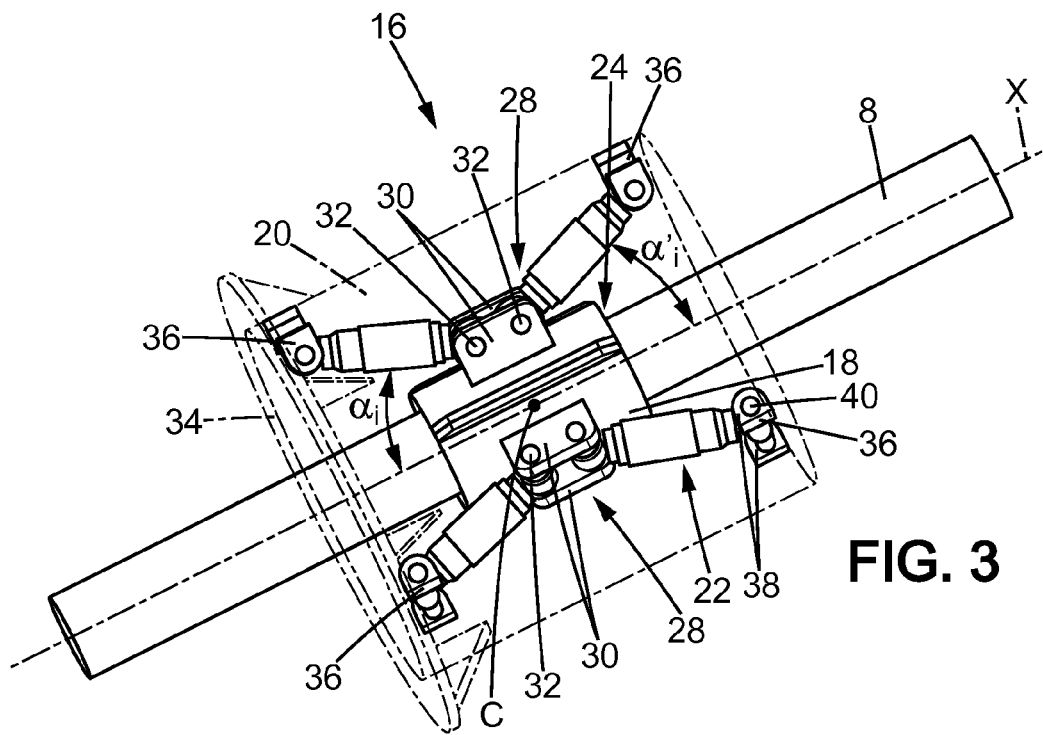
FIG. 3 illustrates a damping device according to the invention.

With reference to FIG. 3, the damping device 16, hereinafter called the device 16, is mechanically coupled to the cable 8 and to the anchor block 12 (and/or to the deck 4). More specifically, it is connected directly to the cable, and indirectly to the anchor block (and/or the deck).

The device 16 comprises a base 18, a tube case 20, and at least one piston damper 22, each forming a damper of the device 16. Preferably, the device 16 comprises a plurality of piston dampers 22.

For the purposes of the invention, "piston damper" or more simply "cylinder" means a piston damper with an approximately linear movement distance. As described in more detail below, this piston damper with an approximately linear movement distance is configured to dissipate at least part of the energy communicated to it, advantageously by viscous damping.

The base 18 is configured to mechanically couple the cable 8 to the piston dampers 22.

To achieve this, the base 18 is configured to contain the cable inside it and to grip the cable. The base 18 is also configured to be connected to the piston dampers 22. It is also advantageously configured to compact the cable.

Figure 4:
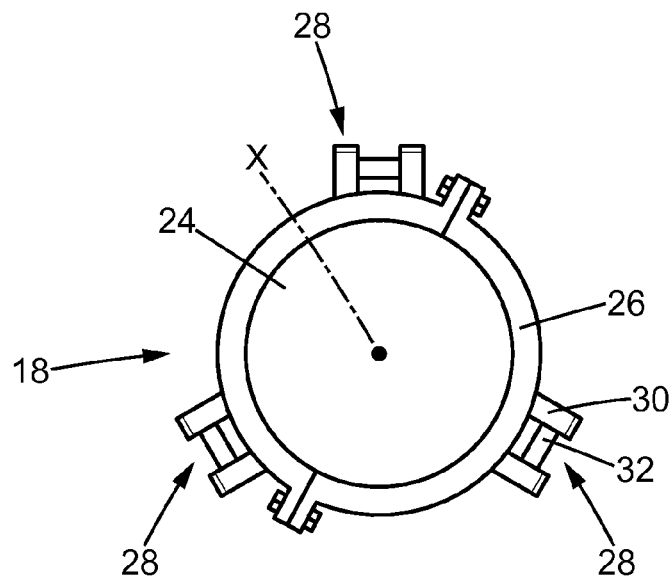
FIG. 4 is a top view of a base of the device in FIG. 3.

With reference to FIGS. 3 and 4, the inside of the base 18 forms a passage orifice 24 inside which the cable 8 fits. The passage orifice 24 extends along a longitudinal axis X. For example, the passage orifice 24 is approximately cylindrical in shape extending along the X axis. For example, it has a sectional shape complementary to the cross-section of the cable. For example, the shape of this section is generally circular, hexagonal or arbitrary. It can be seen that in a configuration at rest like that illustrated on FIG. 3, the cable 8 also extends approximately along the longitudinal X axis, at least locally. However, this alignment between the cable 8 and the X axis can be broken as a result of vibrations.

The base 18 comprises a collar 26 and attachment devices 28.

The collar 26 is configured to compact the cable 8. In other words, the collar 26 is advantageously a compaction collar.

"Compaction" means the application of a centripetal radial force. This assures good mechanical coupling between the base and the cable, and thus good propagation of vibrations from the cable 8 to the base 18.

The collar 26 delimits the passage orifice 24 on the inside 24. The collar 26 has a generally cylindrical shape along the X axis.

The collar 26 advantageously comprises a mechanism for adjustment of the diameter of the passage orifice 24. This assures optimum grip of the walls of the reception orifice 24 and the cable 8. For example, this mechanism includes two circumferential orifices of the collar that are separated from each other, and an adjustment device for attachment of these edges to each other, optionally defining a circumferential interstice with an adjustable dimension between these edges. Optionally, the adjustment mechanism also includes two circumferential edges of the collar 26 opposite said edges, and a hinge type connection enabling rotation of the two circumferential half-collars thus defined around the hinge. Alternatively, as illustrated on FIG. 4, the collar comprises two complementary collar portions, the circumferential edges of which define flange portions that will be fixed to each other adjustably to define the collar and the passage 24 and a good grip of the collar on the cable.

The attachment devices 28 are configured for connection of the piston dampers 22 to the base 18. They are fixed to the collar 26.

Advantageously, at least one attachment device 28 is adapted such that the corresponding piston damper(s) 22 are connected to the base 18 through a swivel connection. Preferably, they all are.

In the embodiment shown in FIGS. 3 and 4, each attachment device 28 is adapted to make the connection of two piston dampers to the base. Alternatively, each attachment device 28 is adapted to connect a single piston damper or more than two piston dampers to the base.

Still with reference to FIGS. 3 and 4, each attachment device 28 may for example comprise two upstands 30 fixed to the collar 26 and, for each piston damper that it will connect to the base 18, a pin 32 that fits in the upstands 30.

The upstands 30 are for example in the form of plates, for example flat plates. The upstands 30 of an attachment device 28 are arranged to be parallel to each other. They are approximately parallel to the X axis. They are also spaced from each other such that one end of the associated piston damper(s) can pass through for its attachment to the attachment device 28.

Each axis 32 is arranged to cooperate with one end of a piston damper 22. Each axis 32 of an attachment device 28 is arranged orthogonally to the corresponding upstands 30.

Advantageously, the attachment devices 28 are uniformly spaced or distributed around the X axis.

In the example in FIGS. 3 and 4, the base 18 comprises three attachment devices 28 each configured for the attachment of two piston dampers 22 to the base 18. The angular separation around the X axis between two consecutive attachment devices 28 is then approximately 120°, as illustrated on FIG. 4.

Furthermore, advantageously, the attachment devices 28 are fixed to the collar 26 in a longitudinally central zone of the collar 26. In other words, the attachment devices 28 are arranged at approximately mid-height along the collar 26. However, as described below, other configurations are envisaged.

The tubing case 20 is configured to protect the base 18 and the cable portion located between the first and second tubes 14, 18 from the external environment. Furthermore, the tube case 20 is configured to enable damping of vibrations of the cable 8 by the piston dampers 22.

As will be made clear by this description and the figures, the tubing case 20 forms a case around the cable in the region of the device 16 to which the piston dampers 22 are connected.

The tubing case 20 will be fixed relative to the anchor block 12, or to the deck 4. To achieve this, the tube case 20 will be fixed to the first tube 14. For example, the tube case 20 comprises an attachment ring 34 arranged at a lower longitudinal end that forms part of it and that will be fixed to the first tube 14.

The tube case 20 has a generally cylindrical shape. Advantageously, its shape is a cylinder of revolution, at least on its outside face.

The case is hollow. Its inside delimits a central passage inside which the base 18, the piston dampers 22 and the cable 8 fit. This passage may for example by approximately cylindrical in shape.

The case 20 is also rigid. For example, it can be made of steel.

In the usage configuration of the device, the case 20 extends along an axis approximately coincident with the X axis.

In this case, "approximately coincident" means that in the usage configuration of the damping device in which the piston dampers, the case and the base are connected together and the cable fits into the base, these axes are coincident, except for alignment offsets that can be caused by relative movements between the base 18 and the case 22 under the effect of vibrations of the cable 8 and movements of the piston dampers 22 in order to attenuate these vibrations.

The case 20 comprises an attachment element 36 for each piston damper 22, configured to connect the associated piston damper 22 to the case 20. This connection is made at the end of the piston damper opposite the end at which the piston damper 22 is connected to the base 18.

Advantageously, at least one attachment element 36 is configured to make the connection between the piston damper 22 associated with the case 20 through a swivel connection. Preferably, they all are.

With reference to FIG. 3, each attachment element 36 is fixed to the case 20. Advantageously, each attachment element 36 is fixed to an internal wall of the case. For example, they are arranged close to a longitudinal edge of the case.

Advantageously, these attachment elements 36 are fixed to the case at positions uniformly distributed around the axis along which the case 20 extends. For example, it includes six attachment elements 36, three of which are uniformly distributed around this axis at a first distance along the case, and three of which are uniformly distributed around this axis at a second distance along the case. Attachment elements located at the first distance are advantageously circumferentially aligned with attachment elements 36 at the second distance. For example, the two distances correspond to opposite longitudinal ends of the case 20, or to arbitrary locations along the case.

For example, each attachment element 36 comprises two upstands 38 arranged to be parallel to each other, and a pin 40 that fits in the upstands.

Due to the rigid nature of the case, the attachment elements do not move relative to each other. Thus, the piston dampers are rigidly connected to each other through the tube case.

The piston dampers 22 are configured to damp vibrations of the cable 8 by cooperation with the cable and the tube case that is fixed relative to the deck.

Figure 5:
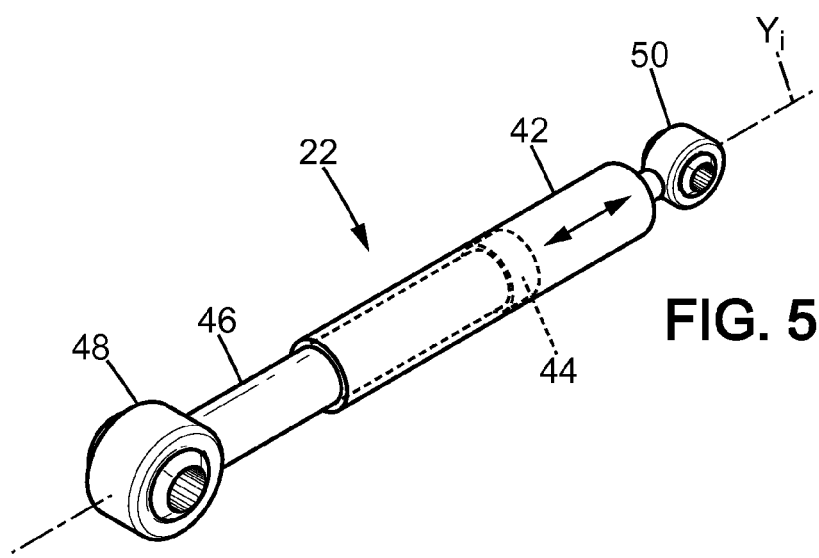
FIG. 5 is a diagrammatic illustration of a piston damper of the device in FIG. 3.

With reference to FIGS. 3 and 5, each piston damper 22 extends approximately along a $Y_i$ axis, in which i is an integer indexing the piston dampers.

Each piston damper is simultaneously connected to the base 18 and the case 20 at its opposite ends. In other words, one of the ends of the piston dampers is fixed to the base 18, and the other end is fixed to the case. Advantageously, as indicated above, the connections of the piston dampers to the base and to the case 20 are made through swivel connections.

With reference to FIG. 5, each piston damper 22 comprises a cylinder 42, a piston 44 that moves inside the cylinder 42, and a rod 46, one end of which is fixed to the piston 44. The opposite end of the rod 42 comprises a connection element 48 that will cooperate with an axis 32 of an attachment device 28 on the base or with a pin 40 of an attachment element 36 of the case. The piston 44 also comprises a connection module 50 at its end opposite the rod 46, that will cooperate with a pin 40 of an attachment element 36 of the case 20, or a pin 32 of an attachment device 28 of the base 18, in opposition to the connection element 48 supported on rod 46.

For example, the connection element 48 and the connection module 50 each comprise a swivel connection that will cooperate with a pin 40 of an attachment element 36 or a pin 32 of an attachment element to define a swivel connection. Advantageously, they are configured such that connections defined between piston dampers forming the system are adjusted, in other words there is practically no play.

The piston dampers are advantageously hydraulic piston dampers.

In the framework of the invention, at least one piston damper 22 is not orthogonal to the X axis within a plane orthogonal to the X axis. In other words, at least one piston damper 22 is inclined relative to the longitudinal X axis of the base 18 by an angle $\alpha_i$ not equal to 90°. Advantageously, as illustrated in FIG. 3, they all are.

In other words, the $Y_i$ axis of the corresponding piston dampers 22 is inclined relative to the longitudinal X axis, in other words the X axis and the $Y_i$ axis are not parallel or coincident. Furthermore, the $Y_i$ axis is not in a plane orthogonal to the longitudinal X axis.

There is an acute angle $\alpha_i$ between each piston damper 22 and the X axis. In the context of the invention, this angle is advantageously less than 80°.

In other words, assuming that the angle $\alpha_i$ corresponds to the acute angle between the two supplementary angles defined by the piston damper considered and the X axis, the angle $\alpha_i$ is less than 80°.

Advantageously, the angle $\alpha_i$ is less than 60°. Even more advantageously, this angle is less than 45°. Also advantageously, it is less than 30°.

For example, is one embodiment, this angle is equal to approximately 25°. This value is an efficient compromise between the overall size resulting from the presence of the piston dampers, and the damping performances of the device 16.

It can be seen that this inclined configuration of the piston dampers is the rest configuration of the device in which the cable is not affected by vibrations and the cables do not apply any load on the piston dampers.

Advantageously, at least one of the piston dampers extends approximately in a plane orthogonal to the X axis (as a result of displacements of the piston dampers under the effect of vibrations that can misalign them slightly from this plane). The angle $\alpha_i$ is then defined within this radial pane. Advantageously, all the piston dampers have this configuration.

Alternatively, at least some of the piston dampers do not extend in a plane orthogonal to the X axis. In such a configuration, the device 16 comprises, for example, a plurality of piston dampers arranged relative to each other and relative to the base 18 so as to balance torsion forces that each piston damper extending in a plane not radial to the X axis tends to apply to the base.

For example, the device then comprises an even number of pairs of piston dampers arranged symmetrically about a plane orthogonal to the X axis.

Furthermore, in the context of the invention, for at least one piston damper 22 inclined at an angle $\alpha_i$ not equal to 90° from the X axis, the damping device 16 comprises a complementary piston damper 22 also inclined by an angle denoted $\alpha'_i$ not equal to 90°. The piston damper 22 and its complementary piston damper are located on each side of a plane P orthogonal to the X axis.

The plane P passes through a centre C of the base 18. The centre C is located along the X axis. It advantageously corresponds to a design centre of the base. For example, the centre C is located at mid-height of the base along this axis. It will be observed that in the assembled configuration of the device in which the cable is gripped in the base, this centre C corresponds to the centre of the corresponding section of the cable 8.

The corresponding connections to the base of the two piston dampers in the pair thus defined are located on each side of the plane P. The same applies to the corresponding connections of these piston dampers to the case 20.

Advantageously, all the piston dampers in the device are arranged in pairs each including a piston damper and its corresponding piston damper inclined by an angle not equal to 90° relative to the X axis, these two piston dampers being arranged on each side of the plane P.

Advantageously, the piston dampers are uniformly spaced around the X axis. More specifically, as described with reference to the attachment devices 28, they are advantageously connected to the base at uniformly spaced locations around the X axis.

When the piston dampers are arranged in pairs, these pairs are connected to the base at uniformly spaced locations around the X axis. For example, for a device comprising three pairs of piston dampers, these pairs are at intervals of 120° around the X axis.

Furthermore, using $Y_i$ and $Y'_i$ (FIG. 6) to denote the directions of a piston damper and its complement respectively, the $Y_i$ and $Y'_i$ axes of the piston dampers of a pair extending in a radial plane intersect at a point $C_i$.

Advantageously, for all or some of the pairs of piston dampers, this point $C_i$ is located approximately in plane P.

Figure 6:
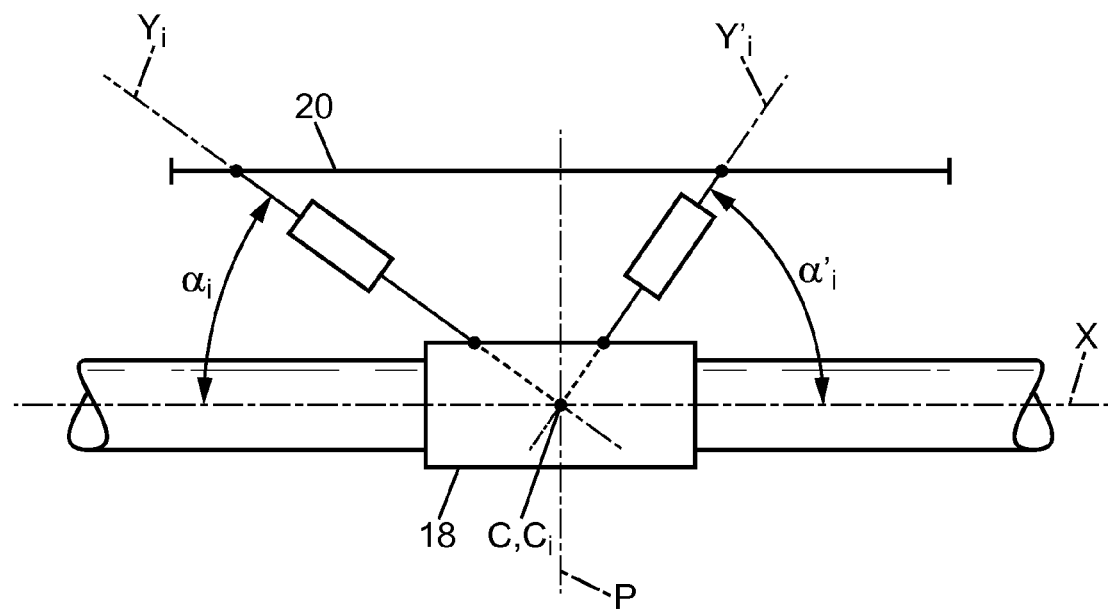
FIG. 6 is a diagrammatic illustration of a damping device according to a variant of the invention.

Also advantageously, for at least some of the pairs of piston dampers, this point $C_i$ corresponds approximately to point C, as can be seen on FIG. 6.

In a first configuration illustrated on FIG. 3, the piston dampers of all or some of the pairs are advantageously located approximately symmetrically about plane P.

For the purposes herein, the term "approximately symmetrical" means that the piston dampers are symmetric about plane P, taking account of piston damper displacements relative to the base 18; that do not necessarily cause a symmetric displacement of the piston dampers in a given pair, relative to plane P.

In this configuration, the axes $Y_i$, $Y'_i$ of the two piston dampers in a pair are approximately symmetric about plane P. The angles $\alpha_i$ and $\alpha'_i$ of each of the two piston dampers in a pair are approximately equal. Furthermore, for each attachment device 28 of the base 8, the two pins 32 that it comprises are arranged symmetrically with each other about plane P. Similarly, in the assembled configuration of the damping device, the attachment elements 36 of the case 20 are arranged approximately symmetrically with each other about plane P (except that the case 20 is subject to horizontal displacements relative to the base 18, as mentioned above).

Advantageously, the piston dampers in a pair symmetric in this manner then have approximately identical coefficients of viscosity. The coefficient of viscosity is derived from a behavioural model of the piston dampers. For example, this model is represented by the relation F=c*v, where F is the force developed by the piston damper, v is the displacement velocity of the piston damper piston and c is the coefficient of viscosity. It will be noted that other models can be used, for example models in which the term v has an exponent not equal to one.

In the example in FIG. 3, the damping device 16 comprises three pairs of piston dampers inside each of which the two piston dampers are arranged approximately symmetrically about plane P.

In a second configuration illustrated on FIG. 6, the piston dampers of at least one pair of piston dampers are not symmetric about plane P.

In this second configuration, the angles $\alpha_i$ and $\alpha'_i$ are different from each other. Furthermore, the connections of the two piston dampers to the base and to the case are not symmetric about plane P.

The device then comprises for example attachment devices 28 for each of the piston dampers. Each of these attachment piston dampers 28 comprises a single pin 32. Furthermore, these devices 28 are located at offset locations along the base, and are located on opposite sides of the plane P.

The attachment elements 36 of each of the two piston dampers to the case 20 are located on opposite sides of the plane O at locations that are not symmetric about this plane P.

Advantageously, in this configuration, the piston dampers in a pair are configured to develop forces along the X axis that approximately balance each other. In other words, these developed forces are in approximately the same direction but are practically opposite each other.

For example, to achieve this, the coefficients of viscosity of the two piston dampers are defined as a function of each other. Advantageously, using c to denote the coefficient of viscosity of the piston damper associated with angle $\alpha_i$ and c' to denote the coefficient of viscosity associated with the angle $\alpha'_i$ (for example, c and c' being derived from the model of the behaviour of the piston dampers described above); the following relation is observed:

$$C' = \frac{\sin(2 \cdot \alpha_i)}{\sin(2 \cdot \alpha'_i)} C$$

Preferably, in the second configuration, for at least some of the pairs of piston dampers located in a plane orthogonal to the X axis, the intersection point $C_i$ of the directions of these piston dampers is located in plane P, and corresponds approximately to the centre C.

It will be noted that in the first and second configurations, the piston dampers may or may not be arranged in a plane orthogonal to the X axis. However, advantageously they are, such that the torsion characteristics described above are not applicable. Furthermore, the device may comprise a pair of piston dampers that is not arranged in a radial plane relative to the X axis, and a pair of piston dampers that is arranged in a plane orthogonal to the X axis.

It will also be noted that the $Y_i$, $Y'_i$ directions of the two piston dampers in a pair that do not extend in a plane radial to the X axis advantageously have an intersection point Ci also located approximately in the plane P.

Furthermore, in some embodiments, the first and second configurations are combined. For example, the device comprises one pair of piston dampers located symmetrically about plane P, and one pair of piston dampers that are not symmetric about plane P.

For placement of the damping device 16 on the cable 8, the case 20 is fixed to the tube 14 before the cable 8 is inserted into and anchored in the anchor block 12.

The cable 8 is then inserted (particularly into tubes 14 and 17) and anchored in the anchor block 12.

The base is subsequently made to grip on the cable 8 in the required position, and the piston dampers 22 are then connected to the base 18. The case is then released from the tube 14 and placed on the piston dampers. For attachment of the piston dampers to the base and to the case, one among the connection element 48 and the connection model 50 of each piston damper 22 is coupled to a pin 32 of an attachment device 28 of the base 18, and the other is coupled to a pin 40 of an attachment element 36 of the case 20. The orientation of the piston dampers 22 is chosen among the two possible orientations. Advantageously, the piston dampers are fixed to the base 18 and to the case such that the free end of the rods 46 corresponds to a high point on the piston damper.

The case 20 is then fixed to the tube 14 through the ring 34, and the second tube 17 is then added onto the case 20.

In an alternative installation method, the elements of the device 16 may for example be fixed to each other before the cable is inserted and anchored. The cable is then inserted into the base 18 and then anchored, after which the base is made to grip the cable at the required location along the cable. The case 20 is then fixed to the tube 14.

When the damping device 16 is in operation, the cable 8 is subjected to vibrations, that result in movements of the cable 8. Since the cable 8 is gripped by the base 18, these movements are transferred to the base 18 and to the piston dampers 22 that are connected to the base 18. Since they are fixed to the case 20, that itself is fixed to the deck 4, movements transferred to the piston dampers 22 result in a displacement of their piston 44 in the cylinder 42, and thus dissipation of the energy of these vibrations by the piston dampers 22.

Due to the fact that swivel connections connect the piston dampers to the base and to the case, the piston dampers accommodate the displacements and rotations tending to make them work other than in tension and in compression.

The damping device according to the invention has several advantages.

The configuration of the piston dampers in a non-radial layout, in other words not orthogonal to the longitudinal X axis in a radial plane, makes the system more compact. The diameter of the tube case can be reduced. Moreover, the configuration of the case simplifies the design and installation of any additional protection that might be included in the anchor zone 10.

Furthermore, these results are obtained without reducing the damping and stability performances, particularly due to the configuration of the piston dampers in pairs located on each side of the plane P.

Furthermore, the layout of the piston dampers in pairs in which the piston dampers are rigidly connected to each other due to their connection to the rigid case 20, has the effect of compensating for the increase in effects that cause parasites on the damping performances of piston dampers due to their inclination relative to the X axis. The inclination of piston dampers results in longitudinal forces applied to the base that tend to increase these parasite effects, particular due to play and flexibilities of the various elements of the damping device. The configuration of the piston dampers relative to the plane P (possibly jointly with the choice of the damping behaviour of one piston damper relative to the other piston damper of the pair) can balance this phenomenon, and therefore contribute to improving the damping performances of the device. This effect is also reinforced by the adjusted nature of the connections of the piston dampers to the case and to the base, in other words without any play.

The above description was made non-limitatively within the framework of application of the invention to a bridge.

In general, regardless of what type of construction work 2 is envisaged, the construction work includes an anchor block 12 inside which one end of the cable 8 fits. The case 20 is then fixed relative to the anchor block 12, to which it is fixed by means of an intermediate element such as the first tube.

The invention claimed is:

1. A damping device for damping vibrations of a cable, the damping device comprising:
   a base comprising a substantially cylindrical collar that delimits a passage orifice for reception of the cable, the passage orifice extending at least along a longitudinal axis;
   at least one first piston damper connected to the base and inclined relative to the longitudinal axis by an angle not equal to 90°; and
   a second piston damper associated with the first piston damper, connected to the base and inclined relative to the longitudinal axis by an angle not equal to 90°,
   the first and second piston dampers being located on opposite sides of a first plane orthogonal to the longitudinal axis and containing a centre of the base located along the longitudinal axis.

2. The damping device according to claim 1, comprising a plurality of first piston dampers connected to the base and inclined from the longitudinal axis by an angle different from 90°, the damping device comprising, for each first piston damper, a second piston damper associated therewith, connected to the base and inclined from the longitudinal axis by an angle different from 90°, each first piston damper and the second piston damper associated therewith being arranged on opposite sides of the first plane.

3. The damping device of claim 1, wherein the first and second piston dampers are not arranged symmetrically relative to each other about the first plane.

4. The damping device of claim 3, wherein the first and second piston dampers are configured to develop forces along the longitudinal X axis that balance each other.

5. The damping device of claim 1, wherein the first and second piston dampers are arranged symmetrically relative to each other about the first plane.

6. The damping device of claim 1, wherein the angle between each first piston damper and the longitudinal axis is an acute angle less than 80°.

7. The damping device of claim 6, wherein the acute angle is less than 45°.

8. The damping device of claim 1, further comprising a tube case defining a central passage inside which the base and the at least one first piston damper are arranged.

9. The damping device of claim 8, wherein the tube case is rigid.

10. The damping device of claim 8, wherein the tube case has a generally cylindrical shape.

11. The damping device of claim 8, wherein the at least one first piston damper is connected to the tube case through one end of said at least one first piston damper opposite the base.

12. The damping device of claim 11, wherein at least one first piston damper is connected to the tube case through a swivel connection.

13. The damping device of claim 1, wherein at least one piston damper is connected to the tube case through a swivel connection.

14. The damping device of claim 1, wherein the first and second piston dampers are located in a second plane orthogonal to the longitudinal axis.

15. The damping device of claim 2, wherein the pairs of associated first and second piston dampers are connected to the base at uniformly spaced locations around the longitudinal axis.

16. The damping device of claim 1, wherein the base comprises a collar to contain and compact the cable, the collar delimiting the inside of the passage orifice.

17. A construction work, such as a bridge, comprising a cable and a damping device, wherein the damping device comprises:
   a base comprising a substantially cylindrical collar that delimits a passage orifice in which the cable is fitted, the passage orifice extending at least along a longitudinal axis, and
   at least one first piston damper connected to the base and inclined relative to the longitudinal axis by an angle not equal to 90°, and a second piston damper associated with the first piston damper, connected to the base and inclined relative to the longitudinal axis by an angle not equal to 90°, the first and second piston dampers being located on opposite sides of a first plane orthogonal to the longitudinal axis and containing a centre of the base located along the longitudinal axis.

18. The construction work of claim 17, further comprising an anchor block inside which one end of the cable fits to anchor the cable, the damping device comprising a tube case defining a central passage inside which the base and the at least one first piston damper are located, the at least one first piston damper being connected to the tube case by one end of said at least one first piston damper opposite the base, the tube case being fixed relative to the anchor block.

19. The construction work of claim 17, consisting of a bridge.

20. The damping device of claim 6, wherein the acute angle is less 30°.

21. The damping device of claim 1, wherein the first and second piston dampers extend in a plane radial to the longitudinal axis.

* * * * *